(12) United States Patent
Stutz et al.

(10) Patent No.: US 6,886,046 B2
(45) Date of Patent: Apr. 26, 2005

(54) METHODS AND APPARATUS FOR EXTENDIBLE INFORMATION AGGREGATION AND PRESENTATION

(75) Inventors: William Stutz, Clarksville, MD (US); Arulnambi Kaliappan, Weston, FL (US); Ronald Capwell, Eldersburg, MD (US); Paul Martin, Columbia, MD (US); Todd Ogrin, Columbia, MD (US)

(73) Assignee: Citrix Systems, Inc., Ft. Lauderdale, FL (US)

( * ) Notice: Subject to any disclaimer, the term of this patent is extended or adjusted under 35 U.S.C. 154(b) by 615 days.

(21) Appl. No.: 09/891,821

(22) Filed: Jun. 26, 2001

(65) Prior Publication Data

US 2003/0028563 A1 Feb. 6, 2003

(51) Int. Cl.[7] .............................................. G06F 15/16
(52) U.S. Cl. ........................ 709/246; 709/203; 709/202
(58) Field of Search ................................ 709/246, 203, 709/202, 226; 707/2, 7, 10

(56) References Cited

U.S. PATENT DOCUMENTS 5,958,016 A * 9/1999 Chang et al. ............... 709/229
6,701,314 B1 * 3/2004 Conover et al. ............. 707/7
6,721,747 B1 * 4/2004 Lipkin ........................ 707/10

OTHER PUBLICATIONS

U.S. Appl. No. 09/891,822, filed Jun. 26, 2001, Stutz et al.

* cited by examiner

Primary Examiner—Mehmet B. Geckil
(74) Attorney, Agent, or Firm—Lahive & Cockfield, LLP

(57) ABSTRACT

Methods and apparatus for arbitrarily extendible information aggregation and display. This functionality is achieved by abstracting the components of the system into individual modules which communicate using a platform-independent, extendible markup language such as extensible markup language (XML). A designer adds support for new information sources or client devices by abstracting and encapsulating messages to and from the information source or client device in a wrapper using a platform-independent, extendible markup language such as XML.

22 Claims, 6 Drawing Sheets

METHODS AND APPARATUS FOR EXTENDIBLE INFORMATION AGGREGATION AND PRESENTATION

FIELD OF THE INVENTION

The present invention relates to methods and apparatus for the aggregation of information from multiple sources for presentation to an end user. In particular, the present invention relates to abstracted information aggregation and presentation utilizing extendible markup languages such as extensible markup language (XML).

BACKGROUND OF THE INVENTION

The closing decades of the 20th century have been characterized as the beginning of an "Information Age." Before the widespread deployment of computers in the 1970s and 1980s, records and other data were stored in analog, human-readable formats using paper records, microfiche, and microfilm. With computerization, the storage of data became a digital task, storing information on magnetic or optical media in computer-readable formats. Unfortunately, computerization preceded widespread internetworking by roughly twenty years. The result is a dizzying array of data sources often separated by geographical or legal boundaries, stored in potentially incompatible formats, and held by owners whose interests may argue against interoperability and easy access.

However, end users need and want simple access to information from all of these data sources. This need has driven the creation of various techniques enabling a single end user to access and work with information with multiple, disparate data sources. For example, At Home Corporation of Redwood City, Calif. offers the MY EXCITE service. MY EXCITE presents users with a set of selectable information sources including sources for weather information, sources for equity market information, and sources for news information. The user identifies one or more information sources of interest, which the MY EXCITE service provides in a convenient, single page format website that is periodically updated. Without MY EXCITE or a comparable service, the user needs to retrieve this information from disparate data sources using varying methods of communications. For example, the user would need to place a telephone call to the National Oceanic and Atmospheric Administration (NOAA) for weather, purchase the NEW YORK TIMES and read the financial section for equity market information, and use a radio to monitor a news station for the latest news.

FIG. 1 depicts an apparatus for information aggregation and display known to the prior art, not necessarily used by the MY EXCITE service. The aggregator 108 includes functionality to accept an incoming network connection from the client device 100, including security measures using authentication credentials.

After authentication, the aggregator 108 loads preference information, including a list of conduits 112 associated with the user, from persistent storage. Each conduit 112 is adapted to process the information from an information source in data tier 116 and display it on a particular type of client device 100. In one embodiment, an equity market information source is associated with two conduits 112: one for displaying information in hypertext markup language (HTML) and one for displaying information in wireless markup language (WML).

Assume that a designer wishes to add a new information source (e.g., weather information) from data tier 116. This requires the creation of a new conduit 112 for each type of client device (e.g., web browser, WAP phone, etc.) supported by the aggregator 108. Similarly, if the designer wishes to add support for devices using a new display format, then the designer must write a conduit 112 for each information source supported by the aggregator 108.

For a real-world system typically accessing hundreds of data sources in data tier 116 using hundreds of conduits 112, the costs of upgrading the system to address a new display format or incorporate a new information source from data tier 116 are significant.

Moreover, the conduit model only allows the simple aggregation and conveyance of data from an information source to a client device. Information provided by an information source may not be in a form appropriate for direct display on a client device 100. For example, a source of equity market information could provide earnings and price data in response to a ticker symbol supplied by a user of a client device 100. If the user's preference data requires a price-to-earnings ratio, mere presentation of price data and earnings data fails to meet that request. Therefore, it is desirable for the system to permit arbitrary processing of the data received from an information source before its presentation to an end user.

SUMMARY OF THE INVENTION

The present invention provides methods and apparatus for arbitrarily extendible information aggregation and display. This functionality is achieved by abstracting the components of the system into individual modules which communicate using a platform-independent, extendible markup language such as XML. A designer adds support for new information sources or client devices by abstracting and encapsulating messages to and from the information source or client device in a wrapper using a platform-independent, extendible markup language such as XML.

This additional level of abstraction and common intermediate format reduces the effort required to support a new information source or client device. Now a designer only needs to write one conduit to support a new information source or new client device. The common intermediate format permits arbitrary processing of data from an arbitrary information source using a back-end integration server.

In one aspect, the present invention is an apparatus for the aggregation and display of information on a client device. The apparatus module includes a communications module, an assimilation agent, and an integration service. The communications module delivers information to and receives information from a client device. The assimilation agent receives information from at least one information source and encapsulates the information in a first wrapper using a platform-independent extendible markup language. The integration server communicates with the communications module and the assimilation agent. The integration server receives encapsulated information from the assimilation agent, uses a rules engine to process the encapsulated information according to a predefined set of actions, and encapsulates the result in a second wrapper using a platform-independent extendible markup language. The integration server provides the encapsulated result to the communications module.

In one embodiment, the communications module delivers information to and receives information from the client device using hypertext markup language (HTML) or wireless markup language (WML). In another embodiment, the communications module delivers information customized according to a predefined profile. In yet another embodiment, the communications module delivers information customized according to the type of client device. In still another embodiment, the communications module, the integration server and the assimilation agent communicate using XML. In yet another embodiment, the assimilation agent retrieves information from a SQL database, an Oracle database, a Domino database, a document repository, a SAP database, a computer in communications with the Internet, or an indexed database.

In another embodiment, the apparatus also includes a content delivery broker that provides communications between the communications module and the integration server. In yet another embodiment, the communications provided by the content delivery broker utilize XML.

In another embodiment, the apparatus also includes a receiver agent in communication with the integration server, receiving messages sent in a protocol. In yet another embodiment, this protocol is file transfer protocol (FTP), post office protocol, version 3 (POP3), hypertext transfer protocol (HTTP), Microsoft Message Queue messages (MSMQ), simple mail transfer protocol (SMTP), directory polling, and component-object model messages (COM).

In another embodiment, the apparatus also includes a spider agent in communication with the integration server, initiating communications with a data source using a protocol. In yet another embodiment, this protocol is file transfer protocol (FTP), post office protocol, version 3 (POP3), hypertext transfer protocol (HTTP), Microsoft Message Queue messages (MSMQ), simple mail transfer protocol (SMTP), directory polling, and component-object model messages (COM).

In another embodiment, the apparatus also includes a sender agent in communication with the integration server, sending messages using a protocol. In yet another embodiment, this protocol is file transfer protocol (FTP), post office protocol, version 3 (POP3), hypertext transfer protocol (HTTP), Microsoft Message Queue messages (MSMQ), simple mail transfer protocol (SMTP), directory polling, and component-object model messages (COM).

In another aspect, the present invention is a method for processing information from multiple sources for presentation to a user. An assimilation agent receives information from at least one of several information sources. The assimilation agent encapsulates the received information in a first wrapper using a platform-independent extendible markup language. The assimilation agent transmits the encapsulated information to an integration server. The integration server processes the information in accord with a predefined set of rules. The integration server encapsulates the processed information in a second wrapper using a platform-independent extendible markup language. The integration server transmits the processed information to a communications module. The communications module delivers the processed information to a client device.

In one embodiment, the communications module delivers the processed information to a client device by identifying the type of client device or the type of the processed information. In another embodiment, the communications module additionally selects an XML style sheet based (XSL) on the type of the client device or the type of the processed information and completes the selected XSL using the processed information. In still another embodiment, the communications module additionally transforms the completed XSL to a form suitable for display on the client device and provides the transformed result to the client device.

In another aspect, the present invention is an article of manufacture storing computer-readable program means for aggregating information from multiple sources for presentation to a user. The article of manufacture includes computer-readable program means for receiving, by an assimilation agent, information from at least one of a set of information sources, computer-readable program means for encapsulating, by the assimilation agent, the received information in a first wrapper using a platform-independent extendible markup language, and computer-readable program means for transmitting, by the assimilation agent, the encapsulated information to an integration server. The article of manufacture also includes computer-readable program means for processing, by the integration server, the encapsulated information in accord with a predefined set of rules, computer-readable means for encapsulating, by the integration server, the processing information in a second wrapper using a platform-independent extendible markup language, and computer-readable program means for transmitting, by the integration server, the processed information to a communications module. The article of manufacture also includes computer-readable program means for delivering, by the communications module, the processed information to a client device.

In one embodiment, the computer-readable program means for delivering, by the communications module, the processed information to a client device itself includes computer-readable program means for identifying the type of client device or the type of the processed information. In still another embodiment, the computer-readable means for delivering, by the communications module, the processed information to a client device itself also includes computer-readable program means for selecting an XSL based on the type of client device or the type of the processed information, and computer-readable program means for completing the XSL with the processed information. In yet another embodiment, the computer-readable means for delivering, by the communications module, the processed information to a client device itself also includes computer-readable program means for transforming the XSL to a form suitable for display on the client device and computer-readable program means for providing the transformed XSL to the client device.

BRIEF DESCRIPTION OF THE DRAWINGS

These and other advantages of the invention may be more clearly understood with reference to the specification and the drawings, in which.

In the drawings, like reference characters generally refer to the same parts throughout the different views. The drawings are not necessarily to scale, emphasis instead being placed upon illustrating the principles of the invention.

DETAILED DESCRIPTION OF THE INVENTION

In brief overview, Applicants' invention provides methods and apparatus for extendible information aggregation and presentation. The present invention reduces the effort required to add support for new display formats or new information sources by introducing an additional layer of abstraction into the process of information aggregation and display. A designer identifies an information source she wishes to make available in aggregation with other information sources. Working with a generic software object, the designer builds an assimilation agent that provides one-way or two-way communications with the information source using messaging in a platform-independent extendible markup language such as XML. An integration server accepts messages encapsulating information from the assimilation agent for processing. The integration server provides the processed messages to a communications module for display on a client device.

Portal Server (PS)

Figure 1:
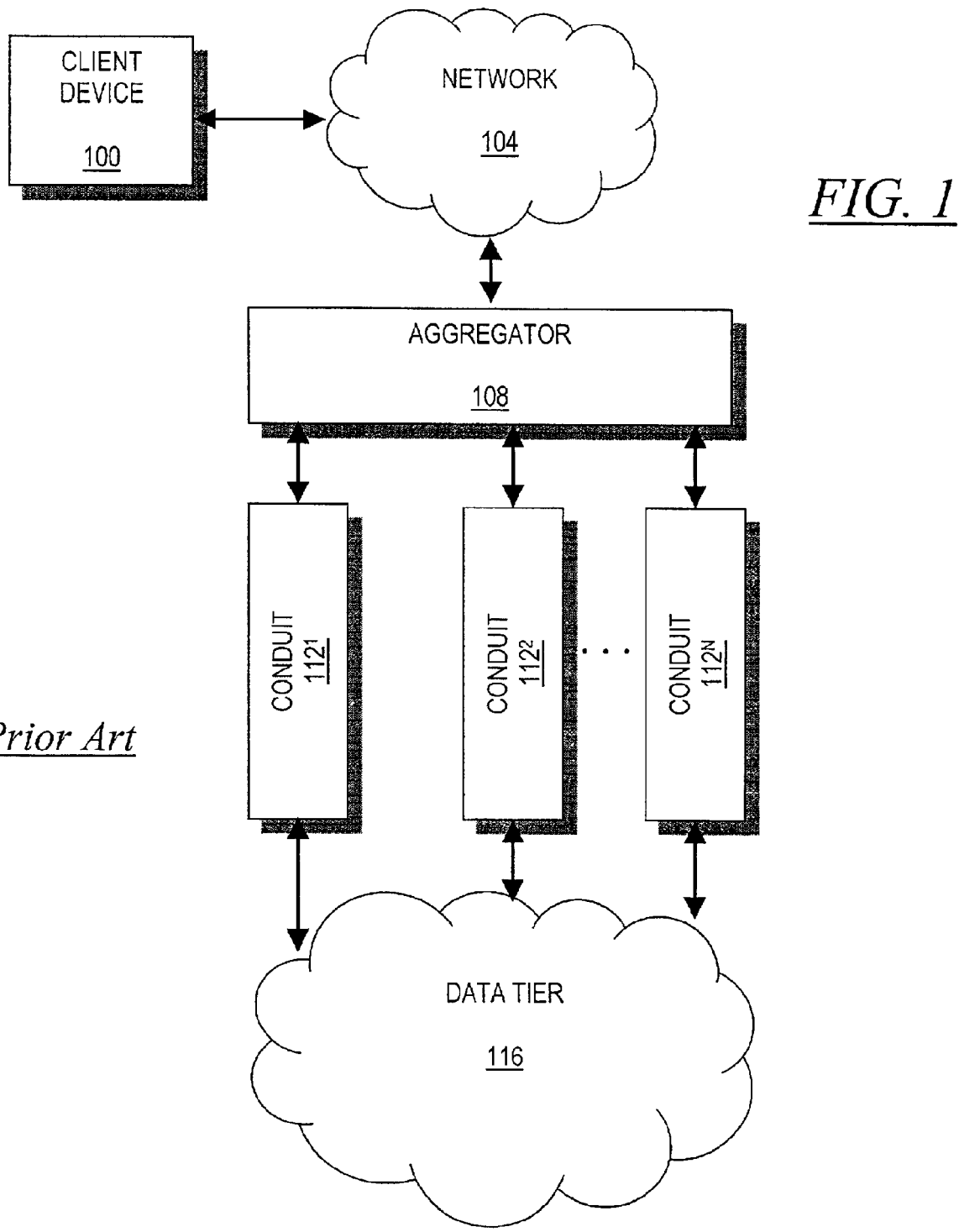
FIG. 1 is a block diagram of a prior art software system for the aggregation and display of information.
Figure 2:
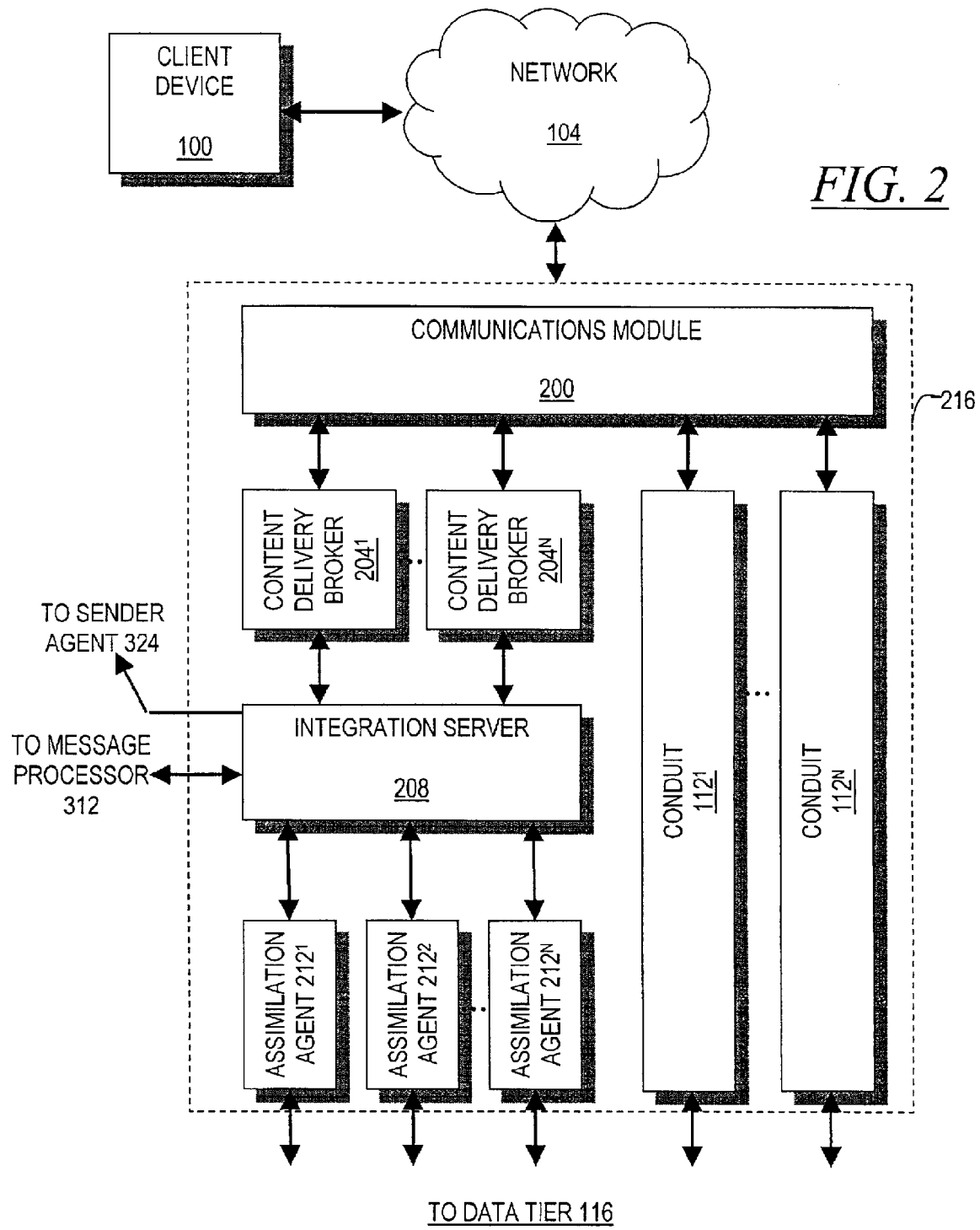
FIG. 2 is a block diagram of an embodiment of a software system in accord with the present invention.

FIG. 2 depicts an embodiment of a software system in accord with the present invention. The system includes a communications module 200 in communication with various content delivery brokers (CDBs) 204 and conduits 112. CDBs 204 direct communicate with an integration server (IS) module 208, while prior art conduits 112 direct communicate with an information source in data tier 116, bypassing the IS module 208. The IS module 208 itself indirect communicates with information sources in data tier 116 through assimilation agents (AAs) 212. In the aggregate, these modules are conveniently referred to as the portal server (PS) 216.

The component modules of the PS 216 are typically software objects instantiated by a controlling process or dispatcher on an as needed basis. For example, when a user connects to the PS 216, a dispatcher instantiates a communications module 200 to communicate with the user's client device 100. Similarly, when the IS module 208 requires information from an information source, the dispatcher instantiates an assimilation agent 212 to intermediate with the information source.

Because of the diversity and facility of modern programming practices, the component modules of the PS 216 take many different forms. In some embodiments, the component modules are compiled binary objects in accord with CORBA, ActiveX, OpenDoc, or other object-oriented frameworks. In other embodiments, the component modules are scripts written in Perl, JavaScript, VBScript, or other scripting languages that are translated into machine language before execution. In still other embodiments, the component modules are binary executables compiled from files written in one or more programming languages including but not limited to C, C+−, C#, Lisp, or Pascal.

Each component module of PS 216 provides its own specialized functionality. The communications module 200 communicates with client devices 100. The CDBs 204 provide a consistent interface for communications with IS module 208. Conduits 112 interface directly with external data sources such as a website, providing information to communications module 200 for display on a client device 100. Assimilation agents (AAs) 212 not only provide a consistent interface with internal and external data sources, but also encapsulate information from a data source in an platform-independent, extendible markup language that renders it susceptible to automated processing by IS module 208. In some embodiments, AAs 212 also perform predefined tasks on business objects such as data files or word processor files. The IS module 208 enables the automation of business processes, gathering information from sources including AAs 212 and processing it in accord with predefined actions and conditional rules.

Communications between the component modules in FIG. 2 utilize a platform-neutral extendible markup language such as XML. These communications contain, either directly or indirectly (e.g., through use of embedded URLs or other locators), business objects such as documents, or remote procedure calls (RPCs) such as search requests. The contents of a communication are typically encapsulated in markup language by defining a message type for the communication. Message types provide metadata and routing information necessary to exchange data between an information source and PS 216 regardless of the individual protocols used and supported by the information source.

In normal operation, a user with a client device 100 establishes communications with one or more server computers executing software providing the desired functionality of the PS 216. The client device 100 typically interconnects with the server computers using a network 104 that passes messages encoded in an agreed-upon protocol.

The client device 100 is typically an electronic device capable of accepting input from a user and graphically displaying data. In one embodiment, client device 100 is a personal digital assistant (PDA). The PDA graphically displays information which the user interacts with using a stylus, keyboard, or other input device. In another embodiment, client device 100 is a personal computer running a web browser. A browser window graphically displays information which the user interacts with using a mouse, keyboard, trackball, or other input device. In other embodiments, client device 100 is a web-aware cell phone or a thin client program such as METAFRAME from Citrix Software, Inc. of Ft. Lauderdale, Fla.

The network 104 typically carries data using electrical signaling, optical signaling, wireless signaling, a combination thereof, or any other signaling method known to the art. The network can be a fixed channel telecommunications link such as a T1, T3, or 56 kb line; LAN or WAN links; a packet-switched network such as TYMNET; a packet-switched network of networks such as the Internet; or any other network configuration known to the art. The network typically carries data in a variety of protocols, including but not limited to: user datagram protocol (UDP), asynchronous transfer mode (ATM), X.25, and transmission control protocol (TCP).

Once a connection is established, at least one server computer executes software providing the functionality of communications module 200. The communications module 200 identifies the type of client device 100 and uses this information to structure its interactions with the client device 100. In one embodiment, the communications module 200 identifies the type of client device 100 by examining metadata provided by the client device 100 when initiating the connection. For example, when the client device 100 is a personal computer executing a web browser program, it will typically provide metadata identifying the web browser, whether the browser is "Mozilla-compatible," and some information about the operating system hosting the web browser. This identification information enables the communications module 200 to identify and deploy themes or style sheets that use the specific features supported by the web browser, including non-standard features or features that vary between browser implementations.

In another embodiment, the communications module 200 identifies the type of client device 100 by the number of the port on which the client device 100 attempts to establish a connection. If the port number is 80, the communications module 200 assumes the client device 100 supports hypertext transfer protocol (HTTP) and subsequently display using hypertext markup language (HTML). If the port number is 9200, the communications module assumes the client device 100 supports wireless access protocol (WAP) and subsequently displays using wireless markup language (WML).

The communications module 200 typically operates by accessing stored template files associated with a particular type of client device 100 and merging the templates with data received from the CDBs 204 for display to the client device 100. In one embodiment, these template files are XML style sheets (XSLs) with tags mapping to HTML and WML tags. Template files typically specify a display scheme appropriate for the client device 100. For example, in one embodiment where client device 100 is a personal computer running a web browser program, a template file may specify a table with two columns where the first column occupies 30 percent of the screen and the second column occupies the other 70 percent of the screen.

After identifying of the client device 100, the communications module 200 invokes a security broker (not shown) to authenticate the user's identity. In one embodiment, the security broker directs the communications module 200 to prompt the user for an identifier and a password. The user enters an identifier and password, which the communications module 200 provides to the security broker. The security broker checks the identifier and password against an internal database, file, or system registry to authenticate the user. If the identifier and password provided are not valid, the system denies access to the user and closes the connection to the client device 100. In other embodiments, authentication credentials accepted by the security broker include but are not limited to shared secrets, public/private key schemes, biometric data, or other forms of authentication well known to the art.

In another embodiment, the security broker leverages the authentication services provided by its operating system environment. For example, when the operating system is a member of the WINDOWS family of operating system products from Microsoft Corporation of Redmond, Wash., the security broker leverages the user, group, and domain information stored in the operating system and associated with the user.

In one embodiment the security broker is a COM object built using commercially-available programming tools, as described above. In another embodiment, the security broker supports methods including but not limited to user login, user logout, group enumeration, user enumeration, the enumeration of users in a particular group, and the changing of authentication credentials.

After completing the authentication process, the communications module 200 accesses personalization information associated with the user and stored in an internal database (not shown). This personalization information typically includes but is not limited to: a set of CDBs 204 for retrieving information from IS 208 for display to the user, a set of conduits 112 for retrieving information directly from information sources in data tier 116, and a set of predefined workflows for use with IS module 208, as discussed in further detail below.

Using the user's personalized settings, PS 216 proceeds to aggregate information for display on the user's client device 100. The system invokes each CDB 204 and conduit 112 associated with the user. In turn, an invoked CDB 204 or conduit 112 provides information to the communications module 200 for display to the end user. Some CDBs 204 simply provide a dialog box or other graphical interface elements upon invocation. Other CDBs 204 trigger one or more business flows in the IS module 208. Conduits 112 may directly query or poll information sources such as a search engine before providing output to the communications module 200. The source code for an exemplary conduit 112 that reads a list of stock symbols and displays related data from CNBC follows:

```
//Implementation of the ISequoiaConfig interface
STDMETHODIMP CMyAgent::Configure(BSTR configSpace, BSTR
configName, VARIANT config, VARIANT_BOOL* pErrorCode)
{
    // get the necessary info from the DOM document
    MSXML::IXMLDOMDocumentPtr pXMLDoc(config);
    // Read list of stock symbols to get data for, put into a collection
    MSXML::IXMLDOMNodeListPtr pNodeList =
        pXMLDoc->selectNodes("/stocks/symbols");
    if (pNodeList)
    {
        for(int Icv=0; Icv<pNodeList->length; Icv++)
        {
            MSXML::IXMLDOMNodePtr pNode = pNodeList->item[Icv];
            _bstr_t symbol = pNode->text;
            m_pCollection->AddItem(_variant_t(symbol));
        }
    }
};
//Implementation of the ISequoiaAgent interface
STDMETHODIMP CMyAgent::Process(IDispatch * Context,
VARIANT_BOOL * bResult)
{
    _bstr_t strResult(" ")
    //Create the output of the CDA
    strresult += "<SCRIPT language="JavaScript">"
    strresult += strresult & "function submitForm( ){"
    strresult = strresult & "if (ValidateSymbolPresence( )){"
    strresult = strresult & "document.frmQuote.submit( );"
    strresult = strresult & "return true;}"
    strresult = strresult & "else{"
    strresult = strresult & "return false;"
    strresult = strresult & "}"
    strresult = strresult & "}"
    strresult = strresult & "function ValidateSymbolPresence( )"
    strresult = strresult & "{"
    strresult = strresult & "var OK = true;"
    strresult = strresult & "if (document.frmQuote.Symbol.value = =")"
    strresult = strresult & "{"
    strresult = strresult & "alert('Please enter a symbol . . . ');"
    strresult = strresult & "OK = false;"
    strresult = strresult & "document.frmQuote.Symbol.focus( );"
    strresult = strresult & "} return(OK);"
    strresult = strresult & "}"
    strresult = strresult & "</SCRIPT>"
    strresult = strresult & "<FORM action=""http://host.cnbc.com/
    jetson/Symbol_Go_Box.html"" target=""_new""
    method=""post"" name=""frmQuote"" onSubmit=""return
    ValidateSymbolPresence( )"">"
    strresult = strresult & "<TABLE>"
    strresult = strresult & "<TR>"
    strresult = strresult & "<TD>"
    strresult = strresult & "<A HREF=""http://www.cnbc.com/
    home.html""target=""_blank""><IMG SRC=""images/cnbc4.GIF""
    width=""151"" height=""71""
    border=""0""></A></TD>"
    strresult = strresult & "<TD valign=middle>QUOTE BOX</TD></
    TR></TABLE>"
    strresult = strresult & "Enter company name or symbol(s):<BR>"
    strresult = strresult & "<INPUT size=""30"" name=Symbol
    value="" "">"
    strresult = strresult & " nbsp;<A HREF=""#""
    onClick=""submitForm( )"">Go</a>"
    strresult = strresult & "</FORM>"
```

-continued

```
// extract the Response object from the context
CONTEXTLib::ISequoiaContextPtr pContext(Context);
CONTEXTLib::ISequoiaResponsePtr pResponse(pContext->Response);
// Write the result to the Response object
pResponse->Write(strResult);
*bResult = VARIANT_TRUE;
return S_OK;
}
```

To reduce reprocessing of frequently accessed but infrequently changing information, the communications module 200 supports per-user and global caching. In one embodiment, per-user caching causes the communications module 200 to present the same information in response to a request from a user until the lapse of a predetermined time period. In another embodiment, the communications module 200 suppresses requests to a CDB 204 until the lapse of the predetermined time period.

In an embodiment without caching, the communications module 200 invokes a CDB 204 to check a user's accounts for e-mail upon receipt of each and every HTTP REFRESH request from a user's web browser, even though e-mail tends to arrive infrequently. In another embodiment, a privileged user enables per-user e-mail caching, setting a timer to check for new e-mail every 10 minutes. A first request to the communications module 200 invokes a CDB 204 to retrieve e-mail headers, presenting this information to the user. Subsequent requests for e-mail data will only return the information cached by the communications module 200 until 10 minutes have passed since the first request.

Global caching operates in a similar fashion, save that the communications module 200 maintains one identical copy of data for all users of the system. Therefore, global caching is ideally suited for applications such as company newsletters, news headlines, and local time and weather information.

In one embodiment, all communications to and from the communications module 200 take the form of messages using a platform independent extendible markup language such as XML. However, most client devices 100 such as web browsers or wireless-aware cell phones do not directly support XML. In one embodiment, a bridging mechanism converts an HTTP request into an XML request. In one embodiment, this functionality is provided by a specialized DLL that translates between the two types of requests. In another embodiment, this functionality is provided by an active server page (ASP), permitting a designer to modify the XML messages sent to the communications module 200 or the HTTP responses and cookies sent to the client device 100. In another embodiment, a second DLL provides functionality to transfer binary files as Multipurpose Internet Mail Extensions (MIME) encoded files.

The following is an exemplary XML message translated by the translation functionality from an HTTP request and sent to PS 216:

```
<cds>
    <sequoia>
        <app.server>
            <configspace>seqportal</configspace>
            <sessionid>A8E206DA-73A2-11D4-BA33-0050DA306FA2</sessionid>
        </app.server>
    </sequoia>
<messageid>20000817170906</messageid>
<routeinfo>
    <sent/>
    <expire/>
    <to/>
<from/>
</routeinfo>
<attachments/>
<body>
    <sequoia.request hostname="h_rose" type="HTML">
        <data name="clientcertificate"/>
        <data name="form">
            <item key="SUBMIT">Search</item>
            <item key="empName">Hannah Rose</item>
        </data>
        <data name="querystring">
            <item key="page">home</item>
            <item key="cdaid">{A5DBC0E4-0F42-11D4-
                8FF1-0050DA2FEE7E}|Search Employee</item>
            <item key="action">doSearch</item>
        </data>
        <data name="servervariables">
            <item key="ALL_HTTP">HTTP_ACCEPT:*/*
                HTTP_ACCEPT_LANGUAGE:en-us
                HTTP_CONNECTION:Keep-Alive
                HTTP_HOST:h_rose
                HTTP_REFERER:http://h_rose/seqportal/cds/
                    host.asp?page=home&cdaid={A5DBC0E4-0F42-
                    11D4-8FF1-0050DA2FEE7E}|
                    Search Employee&action=default
                HTTP_USER_AGENT:Mozilla/4.0 (compatible;
                MSIE 5.01; Windows NT)
                HTTP_COOKIE:h%5Frose%5Fseqportal%5Fcds%
                5FSession%5FID=A8E206DA%2D73A2%2D11D4%
                2DBA33%2D0050DA306FA2
```

-continued

```
        HTTP_CONTENT_LENGTH:26
        HTTP_CONTENT_TYPE:application/x-www-form-urlencoded
        HTTP_ACCEPT_ENCODING:gzip, deflate
    </item>
    <item key="ALL_RAW">Accept: */*
        Accept-Language: en-us
        Connection: Keep-Alive
        Host: h_rose
        Referer: http://h_rose/seqportal/cds/
        host.asp?page=home&cdaid={A5DBC0E4-0F42-11D4-
        8FF1-0050DA2FEE7E}|Search Employee&
        action=default User-Agent: Mozilla/4.0
        (compatible; MSIE 5.01; Windows NT)
        Cookie: h%5Frose%5Fseqportal%5Fcds%
        5FSession%5FID=A8E206DA%2D73A2%
        2D11D4%2DBA33%2D0050DA306FA2
        Content-Length: 26
        Content-Type: application/x-www-form-urlencoded
        Accept-Encoding: gzip, deflate</item>
    <item key="APPL_MD_PATH">/LM/W3svc/1/root
        /SeqPortal</item>
    <item key="APPL_PHYSICAL_PATH">
        C:\Inetpub\wwwroot\SeqPortal\</item>
    <item key="AUTH_PASSWORD"></item>
    <item key="AUTH_TYPE"></item>
    <item key="AUTH_USER"></item>
    <item key="CERT_COOKIE"></item>
    <item key="CERT_FLAGS"></item>
    <item key="CERT_ISSUER"></item>
    <item key="CERT_KEYSIZE"></item>
    <item key="CERT_SECRETKEYSIZE"></item>
    <item key="CERT_SERIALNUMBER"></item>
    <item key="CERT_SERVER_ISSUER"></item>
    <item key="CERT_SERVER_SUBJECT"></item>
    <item key="CERT_SUBJECT"></item>
    <item key="CONTENT_LENGTH">26</item>
    <item key="CONTENT_TYPE">application/x-www-form-urlencoded</item>
    <item key="GATEWAY_INTERFACE">CGI/1.1</item>
    <item key="HTTPS">off</item>
    <item key="HTTPS_KEYSIZE"></item>
    <item key="HTTPS_SECRETKEYSIZE"></item>
    <item key="HTTPS_SERVER_ISSUER"></item>
    <item key="HTTPS_SERVER_SUBJECT"></item>
    <item key="INSTANCE_ID"></item>
    <item key="INSTANCE_META_PATH">/LM/W3SVC/1</item>
    <item key="LOCAL_ADDR">255.255.10.10</item>
    <item key="LOGON_USER"></item>
    <item key="PATH_INFO">/seqportal/cds/host.asp</item>
    <item key="PATH_TRANSLATED">C:\Inetpub\wwwroot\SeqPortal\cds\host.asp</item>
    <item key="QUERY_STRING">page=home&cdaid={A5DBC0E4-0F42-11D4-8FF1-
        0050DA2FEE7E}|Search%20Employee&action=doSearch</item>
    <item key="REMOTE_ADDR">255.255.10.10</item>
    <item key="REMOTE_HOST">255.255.10.10</item>
    <item key="REMOTE_USER"></item>
    <item key="REQUEST_METHOD">POST</item>
    <item key="SCRIPT_NAME">/seqportal/cds/host.asp</item>
    <item key="SERVER_NAME">h_rose</item>
    <item key="SERVER_PORT">80</item>
    <item key="SERVER_PORT_SECURE">0</item>
    <item key="SERVER_PROTOCOL">HTTP/1.1</item>
    <item key="SERVER_SOFTWARE">Microsoft-IIS/4.0</item>
    <item key="URL">/seqportal/cds/host.asp</item>
    <item key="HTTP_ACCEPT">*/*</item>
    <item key="HTTP_ACCEPT_LANGUAGE">en-us</item>
    <item key="HTTP_CONNECTION">Keep-Alive</item>
    <item key="HTTP_HOST">h_rose</item>
    <item key="HTTP_REFERER">http://h_rose/seqportal/cds/host.asp?page=home&
        cdaid={A5DBC0E4-0F42-11D4-8FF1-0050DA2FEE7E}|Search Employee&
        action=default</item>
    <item key="HTTP_USER_AGENT">Mozilla/4.0(compatible; MSIE 5.01; Windows
        NT)</item>
    <item key="HTTP_COOKIE">h%5Frose%5Fseqportal%5Fcds
        %5FSession%5FID=A8E206DA%2D73A2%2D11D4%
        2DBA33%2D0050DA306FA2</item>
    <item key="HTTP_CONTENT_LENGTH">26</item>
    <item key="HTTP_CONTENT_TYPE">application/x-www-form-
        urlencoded</item>
    <item key="HTTP_ACCEPT_ENCODING">gzip, deflate</item>
</data>
```

-continued

```
        <data name="cookies"/>
    </sequoia.request>
  </body>
</cds>
```

Note that the individual component fields of the translated message typically take the form:

```
<data name=" data_type">
    <item key=" key_name"> key_value</item>
</data>
``` where the key value can be any of a form variable, a query string, or a server variable.

Similarly, the following is an exemplary XML message for transmission from communications module 200 to client device 100:

```
<result>
    <number>3</number>
    <anchor>http://training15/smartsummary/getContent.asp
        ?dsn=xassummaries&provider=MSDASQL.1&
        username=sa&password=&
        query=select+summary+from+PHONELISTKeys&
        FileType=xml&index=2
    </anchor>
    <anchor.text>
        <![CDATA[
            http://training15/smartsummary/
            getContent.asp?dsn=xassummaries&
            provider=MSDASQL.1&username=sa&
            password=&query=select+summary+from+
            PHONELISTKeys&FileType=xml&index=2
        ]]>
    </anchor.text>
    <source.server>Enterprise</source.server>
    <summary>
        <![CDATA[
            <A HREF="javascript:showStyledDoc
            ("http://training15/smartsummary/
            getContent.asp?dsn=xassummaries&
            provider=MSDASQL.1&username=sa&
            password=&query=select+summary+from+
            PHONELISTKeys&FileType=xml&index=
            2");">
            Styled Document Goes Here
            </A>
            <BR />
                Customer Service<BR />
            <font color="#999999">
                Summary Info Goes Here
        ]]>
    </summary>
    <display.name></display.name>
    <relevance></relevance>
    <docid></docid>
</result>
```

The translation functionality strips the encapsulating XML tags from the message and sends the HTML information embedded within the CDATA section.

The <anchor.text> tag contains a link to a SmartSummary, a particular type of CDB 204. A SmartSummary CDB 204 presents a user with a convenient interface for a large, disparate set of data sources by organizing the data around a common object or entity. In one embodiment, the PS system 216 is deployed in a hospital environment. Physician users of the system treat patients for various illnesses. An individual patient is associated with entries in tens of data sources scattered across the hospital or managed care group to which the hospital belongs. These sources include, but are not limited to, admitting records, contact and insurance information, transplant reports, radiology reports, laboratory reports, and transcriptions. The efficiency and quality of treatment would be impaired if the physician was required to spend significant amounts of time to locate the records she needs to treat a patient.

The SmartSummary CDB 204 accepts a patient name from a physician and, in one embodiment, invokes a business flow on IS module 208. The flow launches tens of assimilation agents 212 to access all relevant databases, returning information concerning the patient to the IS module 208. The IS module 208 aggregates this data and sends it to the communications module 200 for communication to the physician through her client device 100. This presents the physician with a single configurable screen displaying all the data associated with a patient. Similar implementations of SmartSummary lend themselves to implementation in a finanacial context, where it is desirable to aggregate data concerning credit ratings, purchasing power, outstanding debt, and purchase histories, or in any other context where disparate data sources are naturally organized around a single person or entity.

In another embodiment, the SmartSummary CDB 204 interfaces with a database to retrieve data associated with a person or entity instead of launching assimilation agents 212 to gather data. Typically, receiver agents or spider agents (see below) accept patient data from documents containing patient data that are submitted to the system. In one embodiment, the documents are parsed into individual data elements, which are stored in the database. When the user requests a SmartSummary, the SmartSummary CDB 204 is launched and it retrieves the appropriate information from the database. In one embodiment, this retrieval is accomplished using an assimilation agent 214.

CDBs 204 interface with IS module 208, conveying information from it to communications module 200 for display to the end user on client device 100. If a purely graphical display feature is desired, the CDB 204 may be configured to interact with a "null" data source. For example, if a designer wishes to present a tabbed window interface appearance to an end user, the designer provides a first CDB 204 to create a header frame and a footer frame on the display and a second CDB 204 to draw a tabbed window interface in the header frame.

In one embodiment, the CDB 204 is a software object with various object properties that permit its customization. In one embodiment, the CDB 204 includes properties that control whether an end user can personalize the CDB 204, specify a minimum size for the display of content from the CDB 204, specify the maximum number of times that a CDB 204 can appear on a webpage, and specify whether the CDB 204 refreshes its content on every page request.

In some embodiments, the CDB 204 is script-based. The software designer implements the CDB 204 using VBScript, JScript, Perl, or other scripting languages known to one of ordinary skill in the art. In other embodiments, a CDB 204 is a component-object model (COM) dynamically-linkable library (DLL) developed using programming tools such as VISUAL BASIC STUDIO or VISUAL C++ STUDIO from Microsoft Corporation of Redmond, Wash. In other embodiments, the CDB 204 takes the form of other computer-executable software objects known to one of ordinary skill in the art.

The CDB 204 typically supports at least two methods. A first "Configure" method controls the initialization of the CDB 204. A second "Process" method performs whatever transactions or processing the designer wishes the CDB 204 to perform.

In one embodiment, the software designer uses a set of template files to simplify the coding of CDB 204. The user edits the template files to supply code implementing the desired CDB functionality and compiles the code into a machine-executable program or DLL.

The template files typically include definitions for one or more software sub-objects that a designer may wish to implement in the CDB 204. These sub-objects include but are not limited to application-specific dictionary sub-objects for the storage of data specific to a particular CDB 204, audit trail sub-objects, request sub-objects to contain the parameters associated with incoming requests to the CDB 204, response sub-objects for outgoing responses from the CDB 204, session sub-objects for the storage of session-specific data, cookie sub-objects for the storage of data for use as cookies on a client device 100, header sub-objects to permit the communications module 200 to maximize, minimize, close and refresh a window, user sub-objects to store user-specific settings for communications module 200, and personalize sub-objects to store a user's customizable pages and theme preferences. A designer simply deletes the definitions for sub-objects that the CDB 204 will not utilize.

In some embodiments, PS 216 also includes a set of specialized data sources in data tier 116. One specialized data source is taxonomy. A taxonomy imposes multiple, arbitrary, hierarchical structures upon an arbitrary data set. Typical taxonomies would include a database of customer records that can be selectively organized by employer, or a database of digitally-formatted music that can be selectively organized by artist, album title, or publisher.

PS Interface with Information Sources

Figure 3:
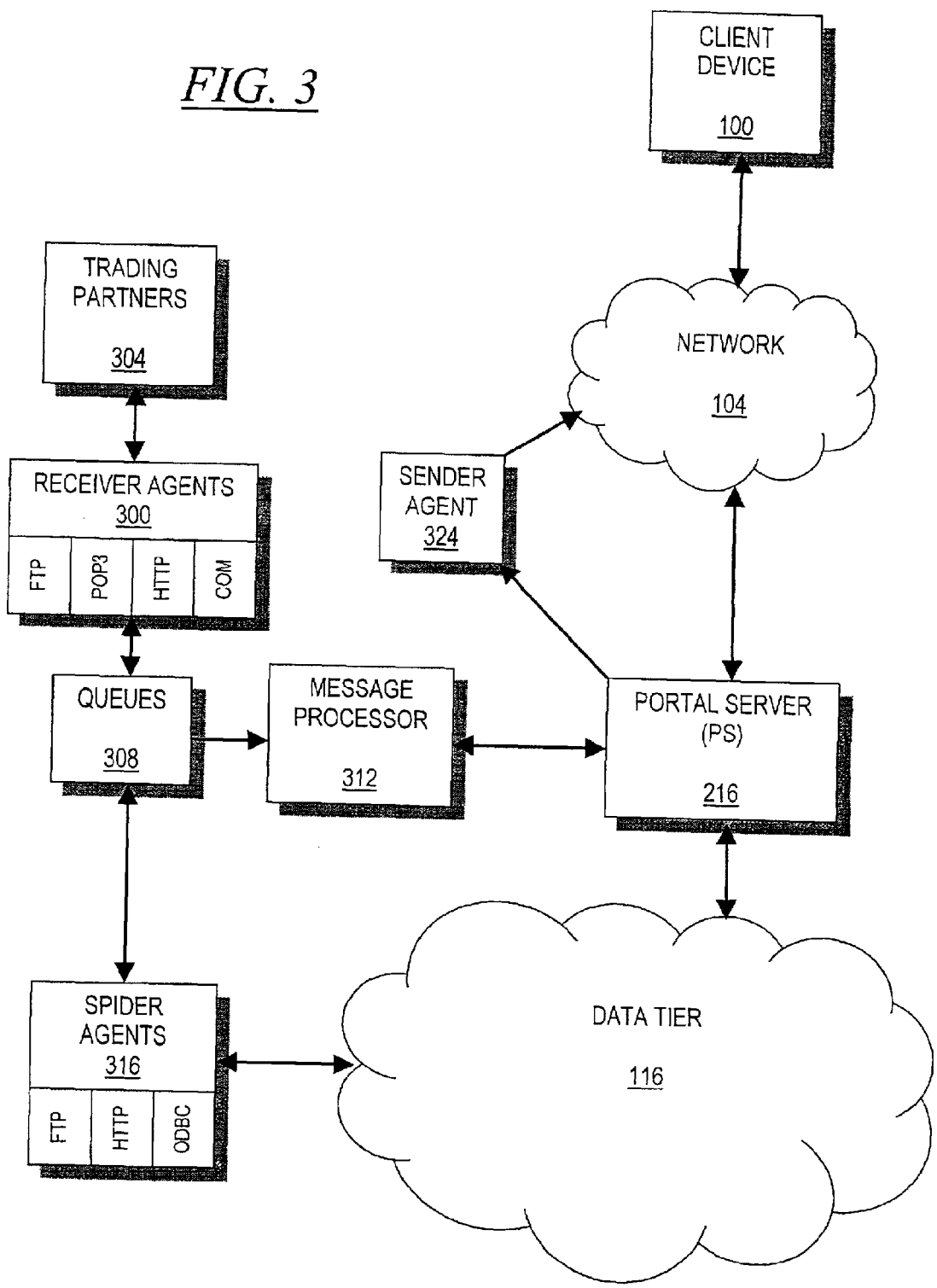
FIG. 3 is a block diagram illustrating a typical interconnection of the portal server 216 with various information sources.

CDBs 204 and conduits 112 provide what is typically referred to as "pull" assimilation agents: they retrieve information from sources in response to user actions such as a login, a mouse click, a button press, or another user-driven event. It is also desirable that third-party information providers have a mechanism to supply information to an embodiment of the present invention for display to a user at intervals controlled by the information provider, instead of the user of the PS 216. This model of information service is typically referred to as a "push" information service. FIG. 3 illustrates how several push information services interact with an embodiment of the present invention, permitting third-party information providers to supply the system with information at their option.

A receiver agent 300 accepts communications from third-party trading partners 304 in a variety of protocols. These protocols include but are not limited to file transfer protocol (FTP), post-office protocol, version 3 (POP3), common-object model (COM) messaging, and HTTP. As illustrated, a receiver agent 300 typically includes a module for each supported protocol. Some embodiments feature modules that support one or more protocols, especially when those protocols are substantially similar. In other embodiments, receiver agent 300 takes the form of a set of receiver agents 300', with each receiver agent 300' supporting one or more individual protocols. Like the other software components of the embodiments of the present invention, receiver agent modules may be implemented as active server pages, COM DLLs, or executable files using commercially-available software development tools, as described above.

Each receiver agent module accepts a message in a given protocol and encapsulates it in a platform-neutral extendible markup language such as XML. This encapsulated message is suited to subsequent asynchronous or synchronous processing at the option of the designer. If the designer elects asynchronous processing, the receiver agent 300 delivers the encapsulated message to message queue 308 for later processing by message processor 312. If the designer elects synchronous processing, the receiver agent 300 transfers the encapsulated message directly to the receiver agent 300 for COM messaging. In another embodiment, the receiver agent 300 routes messages directly to the agent server 604, as discussed below.

Similar to receiver agents 300, spider agents 316 execute data source adapters (DSAs) either on a periodic, scheduled basis or on an aperiodic, as-needed basis. Individual DSAs initiate communications with a remote data source using a particular protocol hard-coded into the DSA. Typical protocols include but are not limited to FTP, HTTP, structured query language (SQL), and open database connectivity (ODBC) protocol. Each DSA encapsulates its retrieved information in a platform-neutral extensible markup language such as XML before routing it to a queue 308 for later processing by message processor 312.

Exemplary uses of a DSA include: accessing a data source, retrieving data, retrieving metadata, or maintaining index logs of events related to the spidering process. The DSA itself typically includes configuration information such as authentication credentials, targets for information storage and retrieval (including but not limited to pathnames, uniform resource locators (URLs), and IP addresses), and the maximum link depth for traversal of a data source.

In one embodiment, a DSA is a COM DLL, designed and compiled using commercially-available tools as described above. In another embodiment, a DSA supports methods included but not limited to a method to return the children of a data source, a method to retrieve data from a temporary file, a method to write data to a temporary file, a method to obtain configuration values for the DSA, a method to log the DSA's data-gathering activities, and a method to retrieve metadata values.

Sender agents 324 provide the PS 216 with one or more methods to communicate with a third party, not necessarily a user of the PS 216, via the third party's communication device. Typically, each sender agent 324 is adapted to communicate with a client device 100 using network 104 using a particular method or protocol. In one embodiment, PS 216 invokes a sender agent 324 that utilizes simple mail transfer protocol (SMTP) to convey information to client device 100: PS 216 sends a message and information identifying the recipient of the message to the sender agent 324. The sender agent 324 opens a connection to network 104 and sends the message to the user, where it eventually arrives at the user's client device 100. In other embodiments, sender agent 324 initiates a telephone call to the third party and uses a combination of computer-generated speech and speech recognition to deliver information to the third party. In another embodiment, sender agent 324 sends a wireless page to the third party's pager or page-equipped cell phone.

Receiver agents 300, spider agents 316, and sender agents 324 are characterized by their extendible, open architectures. As new protocols are developed for use by a receiver agent 300, spider agent 316, or sender agent 324, a user writes a new protocol module to translate or encapsulate the new protocol in the platform-neutral extendible markup language utilized by the components of PS 216.

The message processor-312 periodically reviews one or more queues 308 for messages received from receiver agents 300, spider agents 316, or other sources. In one embodiment, the message processor 312 retrieves any available messages in first-in/first-out (FIFO) order for processing. In another embodiment, if a message is available for processing, the message processor 312 queries the IS module 208 to determine whether the IS 208 is busy, backlogged, or idle. If the IS module 208 is idle, the message processor 312 removes a message from the queue 308 and sends it to the IS module 208 for processing.

Business Flow Processing

Referring to FIG. 2, the IS module 208 interacts with information sources in data tier 116 through assimilation agents (AAs) 212. In one embodiment, IS module 208 includes a flow designer that permits a designer to graphically implement complex processes conditionally processing and routing information between AAs 212 and CDBs 204. These graphically-depicted processes are referred to as "business flows," because they typically model a real world decision-making or business process.

In one embodiment, business flows control the transmission and receipt of information among AAs 212, CDBs 204, and communications module 200 by performing actions and evaluating conditional statements. A sample business flow could respond to a user's invocation of a search CDB 204 by searching the user's Outlook's contacts, querying an LDAP server, posting a form to the ANYWHO webserver provided by AT&T Corporation of New York, N.Y., and querying an X.500 database, ending the chain of events prematurely if any one of the individual queries yielded the desired result.

In one embodiment, the tool used to create a business flow is a WYSIWIG ("what-you-see-is-what-you-get") object-oriented drawing tool such as VISIO from Microsoft Corporation of Redmond, Wash. In another embodiment, the flow designer is a specialized WYSIWIG object-oriented drawing tool that converts the designer's drawings into a series of conditional statements suited to automated execution.

In one embodiment, ovals in the flow signify starts and stops in the process. In another embodiment, diamonds in the flow signify conditional tests, whose satisfaction or failure changes which steps are subsequently executed. In yet another embodiment, straight lines are implemented as conditional tests whose condition is always satisfied.

In one embodiment, a user connects to the XP system 216, authenticates her identity, receives a rendered webpage composed of the results from her associated CDBs 204, and interacts with content on the webpage by entering information into a dialog box and clicking a button. A dispatcher instantiates the IS module 208 to receive the entered information passed from the user through another CDB 204'.

The IS module 208 loads a predetermined business flow from a file, a database or other persistent storage. In one embodiment, the business flow is associated with the individual user. In another embodiment, the business flow is associated with the user's group, position, or another taxonometric characteristic, such as her purchasing privileges.

In another embodiment, the IS module 208 selects a flow or script from a group of flows or scripts in response to metadata or other information contained in the information received from CDB 204.

With the business flow loaded, IS module 208 executes the flow sequentially from start to finish, taking actions and evaluating conditional statements that may affect actions subsequently performed. The IS module 208 retrieves and processes information from message processor 312 and one or more of the AAs 212 on an as-needed, step-by-step basis. IS module 208 provides the processed information to CDB 204 for display on client device 100 or, when appropriate, to sender agent 324 for delivery to another individual.

Assimilation agents (AAs) 212 are similar to receiver agents, spider agents, and sender agents in that they provide a designer with convenient mechanisms to interface IS module 208 with various information sources. For example, a user can add the equivalent of a sender agent using FTP protocol by creating an AA 212 to launch an FTP client program, connect with an FTP site, supply an authorized logon credential, and then upload information to the site using FTP. However, AAs 212 typically provide advanced processing functionality, for example, filtering or otherwise preprocessing information before its receipt by IS module 208.

In one embodiment, AAs 212 provide bi-directional communication with the information sources they interface with. The AA 212 not only retrieves information from the information source, it also receives information from the IS module 208 or end user and applies it to the information source, modifying or updating the information source.

In one embodiment, AAs 212 are script-based. In another embodiment, AAs 212 are component-object model (COM) objects, such as COM dynamically-linked libraries (DLLs) or executable files. In one embodiment, an AA 212 object supports at least two methods: a first method to initialize the AA 212 and a second method to perform whatever processing the designer wants the AA 212 to perform. The output of an AA 212 is typically encapsulated in a platform-independent, extendible markup language such as XML.

AAs 212 can be created and deployed using a variety of software tools. In some embodiments, an object designer uses VISUAL BASIC STUDIO or VISUAL C++STUDIO from Microsoft Corporation of Redmond, Wash. A user specifies a name and a threading model (e.g., single-threaded, "apartment"-threaded, etc.) for the AA 212. The programming system provides a series of template files configured to match the specified name and threading model. The user edits the template files to supply code implementing the desired AA functionality and compiles the code into a machine-executable program or DLL. The user may also add labels or icons for use in IS module 208, or other snap-in extensions.

Typically, template files include definitions for one or more software sub-objects that a user may wish to implement in an AA 212. These sub-objects include but are not limited to application-specific dictionary sub-objects for the storage of data specific to a particular AA 212, audit trail sub-objects, message sub-objects for outgoing messages sent by the AA 212 to a clipboard memory, request sub-objects to contain the parameters associated with incoming requests to the AA 212, response sub-objects for outgoing responses from the AA 212, and session sub-objects for the storage of session-specific data. A designer simply deletes the definitions for sub-objects that the AA 212 will not utilize.

Code for an illustrative AA 212 that checks a document into a repository follows:

```
<%
    Option Explicit
    ' — Variable Declarations — '
    Dim objServer
    Dim oInterchange, oStatus
    Dim sDocType, sRepServer, sFileLoc, sFileName
    Dim sUserID, sAction, sTitle, lFound
    Dim sQuery, sDocId
    Dim metadata, element
    Dim pDOM, newDoc
    On Error Resume Next
    ' — Begin Code — '
    Set pDOM = Request.DOMDocument
    Set objServer = CreateObject("Sequoia.HTMLServer.1")
    With objServer
        sAction = UCase(.HTMLDecode(pDOM.SelectSingleNode("/hyperpublish_original/action").text))
        sDocType =
.HTMLDecode(pDOM.SelectSingleNode("/hyperpublish_original/metadata[@fieldname='DOC_TYPE']").text)
        sRepServer = .HTMLDecode(pDOM.SelectSingleNode("/hyperpublish_original/reposerver").text)
        sFileLoc = .HTMLDecode(pDOM.SelectSingleNode("/hyperpublish_original/fileloc").text)
        sFileName = Right(sFileLoc, Len(sFileLoc) - InStrRev(sFileLoc, "\"))
        sUserID = .HTMLDecode(pDOM.SelectSingleNode("/hyperpublish_original/userid").text)
    End With
    If (sAction = "CHECKIN" Or sAction = "METASAVE") Then
        Set oInterchange = CreateObject("Sequoia.InterchangeServer.1")
        If Not (oInterchange Is Nothing) Then
            Set oStatus = oInterchange.Connect(sRepServer)
            If oStatus.StatusNumber <> 0 Then
                Response.Write "Unable to connect to repository."
            End If
        Else
            Response.Write "Unable to instantiate repository."
        End If
    End If
    If oStatus.StatusNumber = 0 Then
        If (sAction = "CHECKIN") Then
            With oInterchange
                .user = UCase(sUserID)
                .CreateDoc sDocType, newDoc
            End With
            newDoc.localFileName = sFileLoc
            Set metadata = pDOM.getElementsByTagName("metadata")
            For Each element In metadata
                With element
                    ' If no title is provided, use the original filename '
                    If UCase(.attributes.getNamedItem("fieldname").text) = "TITLE" Then
                        If Trim(.text) = " " Then .text = sFileName
                        sTitle = .text
                    End If
                    newDoc.SetIndexFieldValue.attributes.getNamedItem("fieldname").text, .text
                End With
            Next
            ' set OFN index field & check in '
            With newdoc
                .setindexfieldvalue "OFN", sFileName
                .AutoDelete = false
                Set oStatus = .CheckIn
            End With
            If oStatus.statusNumber <> 0 Then
                Response.Write "Unable to check in document." & _
                    "Please make sure index field values and the document filename do not include ampersand
characters."
            Else
                newDoc.Refresh
                ' Append Title and DocID to original message '
                With pDOM
                    .documentelement.appendChild(pDOM.createElement("docid"))
                    .SelectSingleNode("/hyperpublish_original/docid").text = sTitle & "||" & newDoc.DocID
                End With
            End If
            Set newDoc = Nothing
            Call oInterchange.Disconnect
        End If
    End If
    Set objServer = Nothing
```

```
    Set oStatus = Nothing
    Set newdoc = Nothing
    Set oInterchange = Nothing
    Set element = Nothing
    Set metadata = Nothing
    Set pDOM = Nothing
    ' Check if an error occurred - if so, replace original message with a dummy error message. '
    ' The dummy message will force the following decision point to route to a dummy error script, '
    ' causing flow execution to stop. '
    ' (Definition) An error has occurred if there is text on the response buffer. '
    If Trim(Response.Read) <> " " Then pDOM.loadXML("<error>Source: RepositoryCheckIn Script</error>")
%>
```

Sample Display on Client Device

Figure 4:
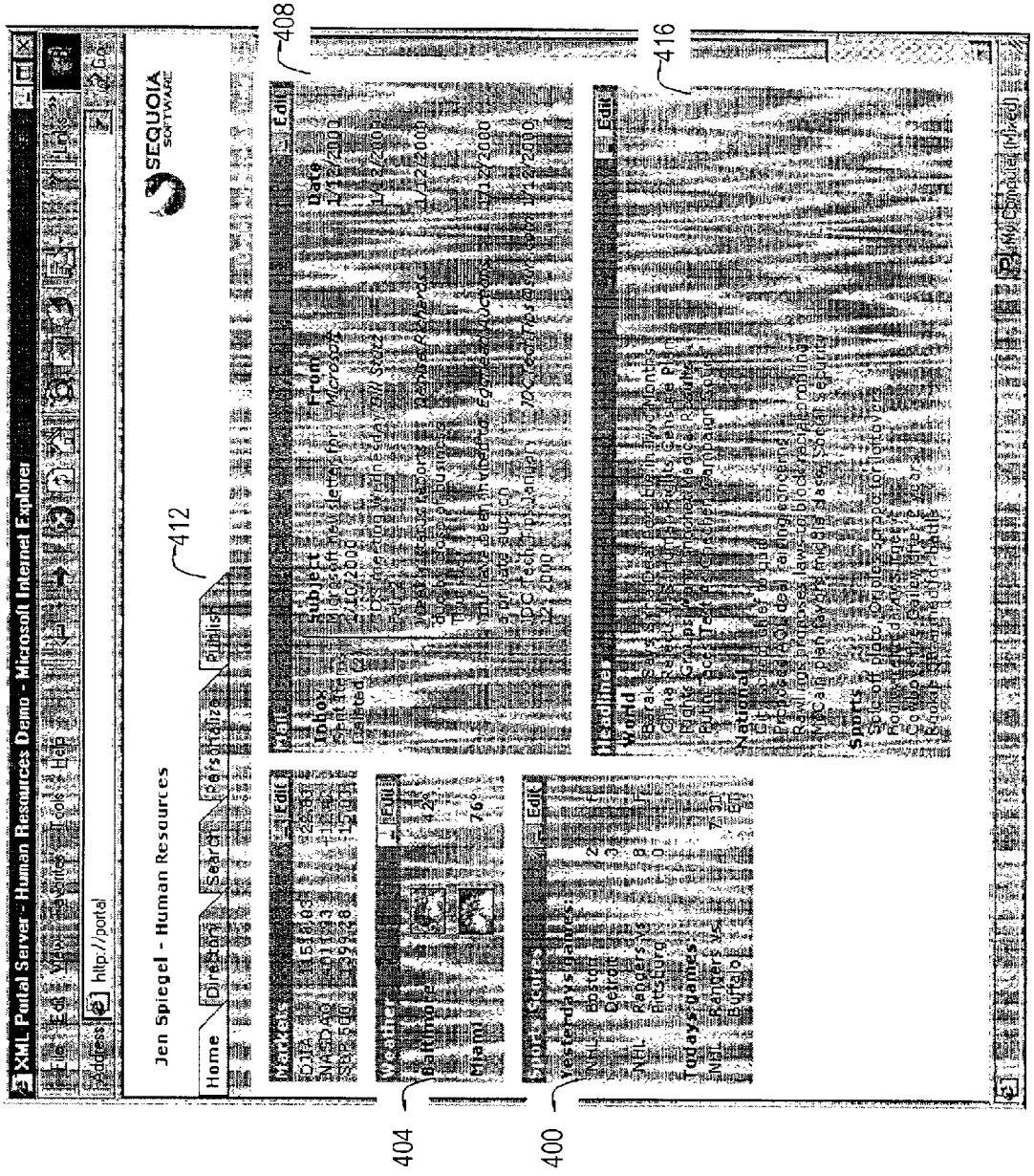
FIG. 4 is a sample display presented by the portal server 216 to an end user using client device 100.

FIG. 4 illustrates a sample display presented on a client device to an end user interacting with one embodiment of the present invention. This discussion is meant to illustrate the operation of one embodiment of the present invention, not to limit the scope of the invention as claimed.

User Jen Spiegel, an employee of the Human Resources department, has completed the authentication process with the security broker as described above. Her personalized set of CDBs has been invoked, and the results aggregated by communications module for presentation to the web browser on her desktop computer.

The user has personally selected some of her CDBs, such as the "Sports Scores" CDB, whose output appears at 400. Other CDBs are automatically available to all employees, such as the "Weather" CDB, whose output appears at 404. Still other CDBs, such as the "Mail" CDB (whose output appears at 408) are available to the user by virtue of her membership in the group of users "Human Resources."

A CDB has drawn the tabbed window interface 412 at the top of the figure. Using these tabs, the user can distribute her CDBs among multiple windowed views, with the components of each view sharing some common taxonometric trait or having a common role appropriate to the institution employing the user. Each CDB whose output is visible on the "Home" page has its properties set to permit the user to customize its appearance. For example, a sub-object in each of the onscreen CDBs permits the user to minimize the appearance of the CDB or edit its settings, such as its size and layout. The designer, who has selected the CDBs that are available to User Spiegel and other users, has enabled per-user and global caching where appropriate. For example, the user's "Mail" CDB is set to per-user caching of 10 minutes, so that the CDB will only check for e-mail in her accounts on various servers scattered across the organization every 10 minutes. Specifying the magnitude of the delay, and in some embodiments the start time for measuring the delay, helps the site administrator balance the load on the POP3 servers the organization uses to administer mail services. Similarly, global caching has been enabled for the "Headlines" CDB (whose output appears at 416), ensuring that every user of the "Headlines" CDB receives the same set of news headlines.

It is important to note that the user sees the results of invoking the software objects that are the CDBs, translated into an appropriate format for her client device. That is, although the user sees the output of the "Weather" CDB 404, the user does not directly see the "Weather" CDB itself.

Illustrative Deployment of XPS System

Figure 5:
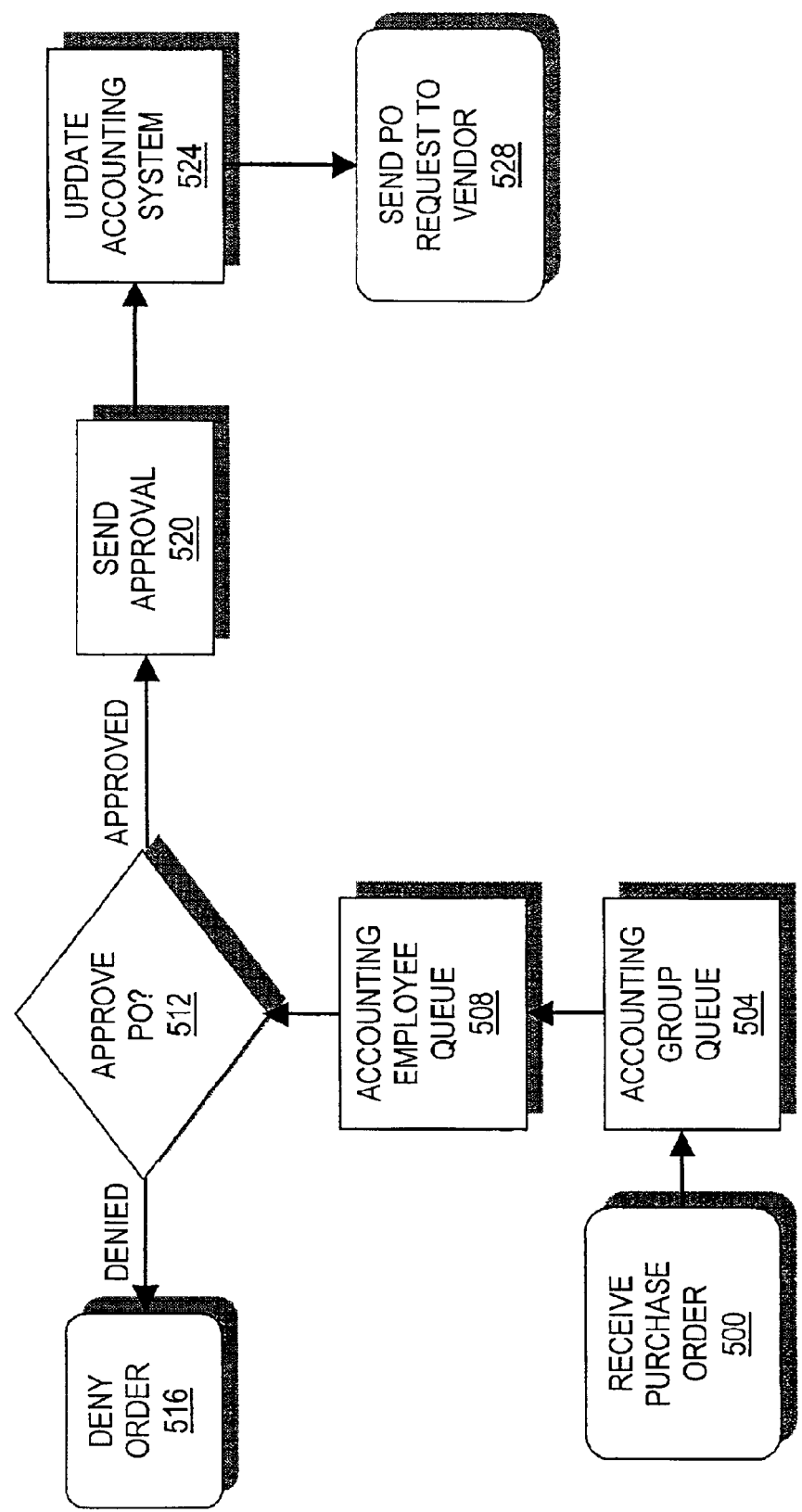
FIG. 5 is an exemplary workflow diagram operating in the integration server module 208.

FIG. 5 depicts a typical business process modeled in the IS module and invoked by a user from a CDB with an input form present on the user's webpage. Again, this discussion is meant to illustrate the operation of one embodiment of the present invention, not to limit the scope of the invention as claimed.

A system designer has met with ACME Manufacturing Company, a hypothetical business entity, to discuss the automation of the purchase order process. The designer and her team has met with various members of ACME's management team, the accounting department, and employees with responsibility for ordering supplies.

The system designer has distilled the process for ordering supplies into a grpahical flowchart presented in FIG. 5. First, an employee with purchasing responsibility completes a purchase order form, entering information including but not limited to desired items for purchase, desired quantities, quoted prices, and shipping information (Step 500). Through interoffice mail the form is routed to the accounting department, where it arrives two days later (Step 504). The next morning, a supervisor in the accounting department reviews the request, calls around to check the availability of her staff, and delegates the request to a particular employee for processing (Step 508). Two days later, the employee processes the request. After completing various phone calls to verify the necessity of the purchase order, the employee either approves or disapproves the purchase order (Step 512). If the request is disapproved, it is returned to the desk of the employee making the purchase order by interoffice mail, arriving some two days later (Step 516).

If the purchase order is approved, notification of approval is returned by interoffice mail to the employee making the purchase order, arriving some two days later (Step 520). The employee in accounting routes the purchase order to another member of the accounting staff to update the accounting mainframe to reflect the purchase (Step 524). Two days later, when the accounting system is updated, the purchase order is sent to the office supply vendor for fulfillment (Step 528).

Having studied this process, the system designer or her peers either implement a new embodiment of the invention or modifies an existing embodiment to provide the desired functionality. The system designer creates a Purchase Order (PO) CDB to provide a web-based purchase order form. The CDB is made available to individual users and groups with purchasing responsibilities. The system designer also codes an AA to interact with the accounting department's legacy mainframe system and a sender to send messages using SMTP. Work Queue CDBs are created for the accounting department and individual users in accounting, permitting the assignment of work to the department as a whole or to individual users, respectively. The system designer uses a WYSIWYG business flow tool to graphically implement the business process of FIG. 5, associating each step in the figure with an action or a decision.

The director of the Supplies Department connects to the PS system and updates his personalized webpages, placing the PO CDB next to the conduit that apprises him of the inventory in his warehouse and the CDB forecasts the supplies that his division of the company will use over the next week, keeping all of these CDBs on a tabbed window titled "Supplies."

On a daily basis, the department supervisor checks the "Supplies" page. When the forecast CDB indicates that on-hand inventory will be exhausted in one month's time, the supervisor invokes the PO CDB. The supervisor enters the name of the supply needed, the quantity needed, and the date the supplies are required. The supervisor clicks a button and the PO CDB generates an HTTP request for transmission through the network. An intermediary DLL intercepts the HTTP request and converts it to an XML message, as described above.

The XML message is routed through the company network until it arrives at the communications module, where it is sent to the appropriate CDB. The CDB forwards the message to the IS module. The IS module examines the metadata contained in the message to determine that the XML message is a purchase order request. The IS module searches its library of business processes for the appropriate flow to handle purchase orders, which is the flow the designer has implemented based on FIG. 5.

Having received a purchase order (Step 500'), the IS module sends it to the Group Work Queue CDB for the accounting department (Step 504'). At this point, the IS module pauses its execution of the business flow until the purchase order is either accepted or rejected.

Members of the accounting department log in to the PS system and authenticate themselves. Each member of the accounting department has access to his or her own set of CDBs and the Group Work Queue CDB, which permits individual employees in the accounting department to assume responsibility for tasks delegated to the department as a whole. In this example, an accounting employee interacts with the Group Work Queue CDB and transfers the PO to her Personal Work Queue CDB for processing (Step 508').

The transferred PO joins the other POs pending in the employee's personal work queue. The Personal Work Queue CDB graphically depicts the employee's outstanding assignments in a list. The employee selects each PO, which in turn invokes another CDB to graphically display the particulars of the PO alongside an APPROVE button and a DENY button (Step 512'). If the employee fails to approve or deny the PO within two days, or if the PO remains unassigned in the Group Work Queue CDB for more than a day, the appropriate CDB routes the PO to the Personal Work Queue for the head of the accounting department.

If the PO is denied, the CDB sends a message back to the IS module indicating the PO has been denied. The IS module resumes processing of the business flow, following the "DENIED" branch away from Step 512'. The IS module invokes a sender to notify the original employee responsible for the purchase order that the PO has been denied (Step 516').

If the PO is approved, the CDB sends a message back to the IS module indicating the PO has been approved. The IS module resumes processing of the business flow, following the "APPROVED" branch. The IS module invokes a sender to notify the original employee responsible for the purchase order that the PO has been approved (Step 520'). The fields of the e-mail are generated through merging administratively-configured text with text from the purchase order. The "To" field is populated by the value of the PO message Xpath //requestor.email. The "Subject" field is always "Your supplies request has been approved." The "Body" field is generated from the following administratively configured text: "Click <a href={MessageURL}>here</a> for PO #{//PO.Number}." In some embodiments, a second sender is invoked to alert the Receiving department of the impending delivery of supplies.

The IS module invokes a custom AA to update the accounting department's legacy mainframe system (Step 524'). Once the system is updated, the IS module forwards the PO to another sender to convey the PO to the appropriate vendor (Step 528'). The sender waits for an acknowledgement from the vendor, which it will forward to the IS module. If the IS module does not receive an acknowledgement within 8 hours, the IS module will send a message to the Group Work Queue CDB for the information technology department for troubleshooting. If the sender receives a rejection from the vendor, the sender forwards the rejection to the IS module, which forwards it to the employee originally responsible for the purchase order.

Deployment of PS in a Load-Balanced Server Environment

Figure 6:
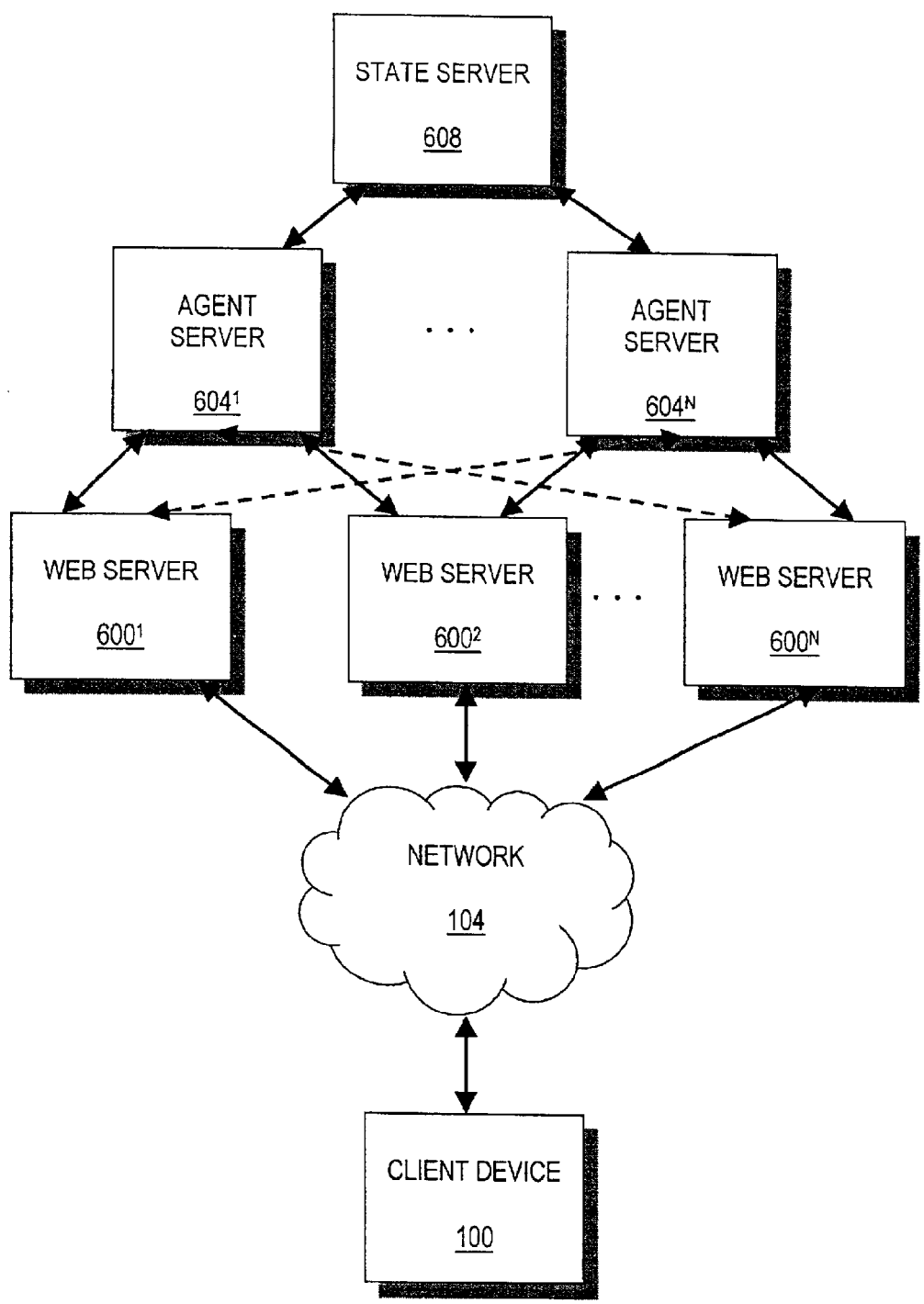
FIG. 6 is a block diagram of an embodiment of a server array executing the software embodiment of FIG. 2 in accord with the present invention.

As illustrated in FIG. 6, some embodiments of the present invention are deployed in a multi-server computing environment to improve performance and the ability to service user transactions. This computing environment typically includes one or more web server processes 600, one or more agent server processes 604, and a state server process 608.

One or more users interact with the system using one or more client devices 100. The client devices 100 typically interconnect with the server computers using network 104 that passes messages encoded in an agreed-upon protocol, as discussed above. The messages sent by client device 100 through network 104 arrive at one or more server computers for processing. The server computers run one or more computer programs providing web server functionality, agent server functionality, state server functionality, or other functionalities as discussed in greater detail below. In the embodiment of FIG. 6, these server processes are web servers $600^1$, $600^2$, and $600^N$; agent servers $604^1$ and $604^N$; and state server 608. As understood by one of ordinary skill in the art, these disparate processes can execute concurrently on a single one-processor computer, multiple one-processor computers, a single multi-processor computer, multiple multi-processor computers, or any combination thereof. Moreover, the embodiment of FIG. 6 only depicts three web server processes, two agent server processes, and a single state server process to facilitate discussion. Embodiments of the claimed invention can assume configurations including any number of processes and any number of server computers. Therefore, this discussion should not be presumed to limit the scope of the claimed invention.

As FIG. 6 indicates, in one embodiment the various server processes have effectively bidirectional channels of communication permitting the passage of information between processes. The particular form of these channels will vary depending on the underlying hardware configuration executing the server processes. For example, if the server processes operate on a network of single-processor machines interconnected by a LAN, the channels can be packets transmitted in accord with Ethernet or Token Ring protocols. In another embodiment, only a subset of server processes include bidirectional channels of communications.

In one embodiment, each server process includes a load-balancing module with functionality to monitor the status of its own server process. In another embodiment, only a subset of the server processes include a load-balancing module. In one embodiment, the module determines whether its server process is operating on a transaction, has a backlog of transactions, or is presently idle. In another embodiment, the load-balancing module includes functionality to share its status with other load-balancing modules and functionality to query other load-balancing modules concerning their status.

In one embodiment, the messages passed through the network 104 are directed by a router to one or more computers running one or more web server processes 600. In another embodiment, the router first queries the web server processes 600 to identify the least-busy process before it routes the message, typically a HTTP GET request. After the least-busy web server process 600 has been identified, the message is routed to it.

The web server 600 parses the HTTP request and services it. In one embodiment, the load balancing module of web server 600 queries each agent server 604 to identify the least-busy agent server 604. The web server 600 passes the request to the least-busy agent server for servicing. In another embodiment, any agent server 604 may force an election at any time by broadcasting a request election datagram to all other agent servers 604. The election results are determined by a comparison of the set of election criteria which is transmitted within the request election datagram transmitted by the requesting agent server 604 with the set of election criteria maintained by each receiving agent server 604'. That is, the first election criterion from the datagram of the requesting agent server 604 is compared by the receiving node to the first criterion of the receiving agent server 604'. The highest ranking of the two criteria being compared wins the comparison and the agent server with that criterion wins the election. If the two criteria tie, then the next criteria are sequentially compared until the tie is broken. If server agent 604' receiving the request election datagram has a higher election criteria than that received in the request election datagram, the agent server 604' receiving the request election datagram issues its own request election datagram. If the receiving agent server 604' has a lower election criteria than the criteria received in the request election datagram, the receiving agent server 604' determines it is not the master agent server and attempts to determine which agent server 604 is the master agent server 604.

In one embodiment the criteria which determine the outcome of the election include: whether or not the agent server 604 is statically configured as a master network information server node; whether the agent server 604 has the higher software version number; and whether the agent server 604 is the longest running agent server 604. In one embodiment, the datagram structure for the election request includes an unsigned shortword for the agent server software version number, an unsigned shortword in which the bits are flags which designate whether the node is statically configured as a master agent server 604 and an unsigned longword containing the amount of time the agent server 604 has been running.

Periodically, the master agent server 604 may transmit a declare message to the other agent servers 604 declaring itself to be the master agent server 604. If another agent server believes itself to be a master agent server 604, the other agent server will request an election. In this way erroneous master agent servers 604 are detected and removed. In addition an election may also be requested: by any agent server 604 when that agent server 604 is instantiated or by any agent server 604 to whom the master agent server 604 has failed to acknowledge an update message. After an election has occurred and the new master agent server 604 has been determined, all the agent servers 604 wait a random period of time and then send a datagram to the master agent server 604 with its latest load information. When master agent server 604 receives an update datagram from a server agent, then the master agent server 604 may reply to the transmitting agent server with an acknowledgment. If the master agent server 604 fails to receive data from an agent server 604, then the master agent server 604 discards the old data from the agent server 604 after a predetermined amount of time.

If an agent server node does not receive an acknowledgment from the master agent server 604 after the agent server 604 has sent an update datagram, the agent server 604 retransmits the update datagram. The agent server 604 will attempt N retransmits (in one embodiment) before it assumes that the master agent server 604 has failed. When this occurs the agent server 604 transmits an election request. If the agent server 604 receives an acknowledgment, then it periodically updates the master agent server 604, in one embodiment every 5 to 60 minutes.

The agent server 604 typically includes a software dispatcher process capable of allocating memory, freeing memory, and instantiating and terminating software processes in allocated memory. The agent server 604 instantiates the software system of FIG. 2, including communications module 200, CDBs 204, IS module 208, and AAs 212.

The agent server 604 uses the state server 608 for the storage of persistent data values and information associated with requests sent to the web server 600. In one embodiment, the state server 608 includes a relational database for storing this information. Using state server 608 for the storage of information associated with ongoing requests permits load balancing with transactional granularity among agent servers 604. For example, if client device 100 sends multiple HTTP GET requests to the system of the present invention, each GET request can be translated into an XML message and routed by the web server process 600 to a different agent server 604. In one embodiment, each agent server 604 processes an isolated request as part of a related transaction by storing and retrieving information related to the transaction in state server 608.

In another embodiment, load balancing between agent servers 604 is implemented at the session level. When a user connects with the system, the least busy agent server 604 is identified. This least-busy agent server 604 is assigned to the user for the duration of her session: all of the user CDB's and other software processes are executed by that agent server. If the user ends her connection and reconnects lately, it is possible that a different agent server 604 will process her transactions.

After agent server 604 instantiates the components of the portal server (PS) system, the instantiated components, the web server 600, the agent server 604, and the state server 608 intercommunicate using messages in a platform-independent extendible markup language such as XML. Upon receiving a request from the end user's client device 100, the web server 600 typically encapsulates a business object such as a document in a markup language wrapper and passes it to the agent server 604. The agent server 604 relays the message to the dispatcher, which in turn relays it to the communications module for processing. In some embodiments, the dispatcher directly routes messages to IS module or an alternate processing engine (not shown). The dispatcher determines the target for transmitted messages by instantiating a rule-based processing engine that examines the contents of the message and makes routing decisions based on its contents. Upon completing service of the request, the agent server 608 proceeds to process the next request it receives.

In the interest of clarity, and not to limit the scope to the invention as claimed, the following example illustrates load-balancing among the web servers 600 and the agent servers 604 of FIG. 6. Referring to the example of FIG. 4, assume that user Jen Spiegel, an employee of the Human Resources department, has begun the authentication process as described above. The web server 600[1], which is hosting the user's session, polls agent servers 604[1] and 604[2] using a load-balancing module to identify the least-busy agent server. Whichever agent server is less busy is assigned the task of instantiating and running the communications module associated with the user's session. When the user begins the authentication process, the web server 100[1] polls agent servers 604[1] and 604[2] using a load-balancing module to identify the least-busy agent server. Whichever agent server is less busy is assigned the task of instantiating and running the security broker associated with the user's session. The process repeats itself for each module of the PS system 216 that requires instantiates and processor time. For example, when the user's list of conduits and CDBs is loaded, each conduit or CDB is potentially routed to a different machine to maintain an even load among agent servers 604.

It is possible to balance loads between agent servers 604 by dividing transactions into individual requests because state server 608 provides persistent storage for the state of the user's session. As each agent server 604 completes a request, it updates the session record on the state server 608 to reflect the completion of the transaction. Session storage on the state server 608 also increases the fault tolerance of the system, enabling the redeployment of computing tasks between agent servers 604 in the event of a failure of one or more agent servers 604.

Many alterations and modifications may be made by those having ordinary skill in the art without departing from the spirit and scope of the invention. Therefore, it must be expressly understood that the illustrated embodiment has been shown only for the purposes of example and should not be taken as limiting the invention, which is defined by the following claims. The following claims are thus to be read as not only literally including what is set forth by the claims but also to include all equivalent elements for performing substantially the same function in substantially the same way to obtain substantially the same result, even though not identical in other respects to what is shown and described in the above illustrations.

What is claimed is:

1. Apparatus for the aggregation and display of information on a client device, said apparatus comprising:
    a communications module delivering information to and receiving information from a client device;
    an assimilation agent receiving information from at least one information source and encapsulating said information in a first wrapper using a platform-independent extendible markup language; and
    an integration server in communication with said communications module and said assimilation agent, said integration server receiving said encapsulated information from said assimilation agent, said integration server comprising a rules engine for processing said encapsulated information in accord with a predefined set of rules and encapsulating the result in a second wrapper using a platform-independent extendible markup language, and said integration server providing said encapsulated result to said communications module.

2. The apparatus of claim 1 wherein said communications module delivers information to and receives information from said client device using one of hypertext markup language (HTML) and wireless markup language (WML).

3. The apparatus of claim 1 wherein said communications module delivers information customized according to a predefined profile.

4. The apparatus of claim 1 wherein said communications module delivers information customized according to the type of client device.

5. The apparatus of claim 1 wherein said communications module, said integration server, and said assimilation agent communicate using extensible markup language (XML).

6. The apparatus of claim 1 wherein said assimilation agent retrieves information from one of a SQL database, an Oracle database, a Domino database, a document repository, a SAP database, a computer in communication with the Internet, and an indexed database.

7. The apparatus of claim 1 further comprising:
    a content delivery broker providing communications between said communications module and said integration server.

8. The apparatus of claim 7 wherein said communications provided by said content delivery broker utilize extensible markup language (XML).

9. The apparatus of claim 1 further comprising:
    a receiver agent in communication with said integration server and receiving messages sent in a protocol.

10. The apparatus of claim 9 wherein said protocol is one of file transfer protocol (FTP), post office protocol, version 3 (POP3), hypertext transfer protocol (HTTP), Microsoft Message Queue protocol (MSMQ), simple mail transfer protocol (SMTP), Directory Polling, and component-object model messages (COM).

11. The apparatus of claim 1 further comprising:
    a spider agent in communication with said integration server and initiating communications with a data source using a protocol.

12. The apparatus of claim 11 wherein said protocol is one of FTP, POP3, HTTP, MSMQ, SMTP, Directory Polling, and COM.

13. The apparatus of claim 1 further comprising:
    a sender agent in communication with said integration server and sending messages using a protocol.

14. The apparatus of claim 13 wherein said protocol is one of FTP, POP3, HTTP, MSMQ, SMTP, Directory Polling, and COM.

15. A method for aggregating information from multiple sources for presentation to a user, said method comprising the steps:
    (a) receiving, by an assimilation agent, information from at least one of a plurality of information sources;
    (b) encapsulating, by the assimilation agent, said received information in a first wrapper using a platform-independent extensible markup language;
    (c) transmitting, by the assimilation agent, said encapsulated information to an integration server;
    (d) processing, by the integration server, said encapsulated information in accord with a predefined set of rules;
    (e) encapsulating, by the integration server, the processed information in a second wrapper using a platform-independent extensible markup language;

(f) transmitting, by the integration server, the processed information to a communications module; and (g) delivering, by the communications module, said processed information to a client device.

16. The method of claim 15 wherein step (g) comprises the steps:

(g-a) identifying at least one of the type of client device or the type of said processed information.

17. The method of claim 16 wherein step (g) further comprises the steps:

(g-b) selecting an XML style sheet based on the result of step (g-a); and (g-c) completing said XML style sheet with said processed information.

18. The method of claim 17 wherein step (g) further comprises the step:

(g-d) transforming the result of step (g-c) to a form suitable for display on said client device; and (g-e) providing the result of step (g-d) to said client device.

19. An article of manufacture having computer-readable program means embodied therein for aggregating information from multiple sources for presentation to a user, said article comprising:

computer-readable program means for receiving, by an assimilation agent, information from at least one of a plurality of information sources;

computer-readable program means for encapsulating, by the assimilation agent, said received information in a first wrapper using a platform-independent extensible markup language;

computer-readable program means for transmitting, by the assimilation agent, said encapsulated information to an integration server;

computer-readable program means for processing, by the integration server, said encapsulated information in accord with a predefined set of rules;

computer-readable program means for encapsulating, by the integration server, the processed information in a second wrapper using a platform-independent extensible markup language;

computer-readable program means for transmitting, by the integration server, the processed information to a communications module; and computer-readable program means for delivering, by the communications module, said processed information to a client device.

20. The article of manufacture of claim 19 wherein said computer-readable program means for delivering, by the communications module, said processed information to a client device comprises:

computer-readable program means for identifying at least one of the type of client device or the type of said processed information.

21. The article of manufacture of claim 20 wherein said computer-readable program means for delivering, by the communications module, said processed information to a client device further comprises:

computer-readable program means for selecting an XML style sheet based on said at least one of the type of client device and the type of said processed information; and computer-readable program means for completing said XML style sheet with said processed information.

22. The article of manufacture of claim 21 wherein said computer-readable program means for delivering, by the communications module, said processed information to a client device further comprises:

computer-readable program means for transforming said completed XML style sheet to a form suitable for display on said client device; and computer-readable program means for providing said transformed style sheet suitable for display on said client device to said client device.

* * * * *